United States Patent
Zhu et al.

(10) Patent No.: US 11,971,772 B2
(45) Date of Patent: Apr. 30, 2024

(54) UNIFIED SEQUENCER CONCURRENCY CONTROLLER FOR A MEMORY SUB-SYSTEM

(71) Applicant: Micron Technology, Inc., Boise, ID (US)

(72) Inventors: Fangfang Zhu, San Jose, CA (US); Jiangli Zhu, San Jose, CA (US); Ying Y. Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/463,100

(22) Filed: Aug. 31, 2021

(65) Prior Publication Data

US 2023/0060804 A1   Mar. 2, 2023

(51) Int. Cl.
*G06F 1/329* (2019.01)
*G06F 1/3206* (2019.01)
*G06F 1/3234* (2019.01)

(52) U.S. Cl.
CPC .......... *G06F 1/3275* (2013.01); *G06F 1/3206* (2013.01); *G06F 1/3278* (2013.01); *G06F 1/329* (2013.01)

(58) Field of Classification Search
CPC .... G06F 1/3275; G06F 1/3206; G06F 1/3278; G06F 1/329
See application file for complete search history.

(56) References Cited

U.S. PATENT DOCUMENTS

| | | | | |
|---|---|---|---|---|
| 5,265,212 A | * | 11/1993 | Bruce, II | G06F 13/364 710/113 |
| 9,075,538 B2 | | 7/2015 | Fulkerson et al. | |
| 2007/0183242 A1 | * | 8/2007 | Miyamoto | G11C 11/22 365/222 |
| 2008/0022140 A1 | * | 1/2008 | Yamada | G06F 1/3237 713/300 |
| 2012/0275235 A1 | * | 11/2012 | Parker | G11C 16/10 365/185.24 |
| 2015/0160712 A1 | | 6/2015 | Jeddeloh | |
| 2018/0059977 A1 | | 3/2018 | Matsuyama et al. | |
| 2019/0065086 A1 | | 2/2019 | Margetts et al. | |
| 2020/0073799 A1 | | 3/2020 | Lee et al. | |
| 2020/0209944 A1 | * | 7/2020 | Palmer | G06F 9/3836 |

OTHER PUBLICATIONS

International Search Report and Written Opinion for the International Application No. PCT/US2022/042076, dated Dec. 21, 2022, 10 pages.

* cited by examiner

*Primary Examiner* — Kim Huynh
*Assistant Examiner* — Cory A. Latham
(74) *Attorney, Agent, or Firm* — Lowenstein Sandler LLP

(57) ABSTRACT

An input/output (I/O) command referencing a memory device is identified. A power limit of the memory device is determined. A power level associated with executing the I/O command is estimated. Responsive to determining that the power level satisfies the power limit, the I/O command is executed.

20 Claims, 5 Drawing Sheets

UNIFIED SEQUENCER CONCURRENCY CONTROLLER FOR A MEMORY SUB-SYSTEM

TECHNICAL FIELD

Embodiments of the disclosure relate generally to memory sub-systems, and more specifically, relate to a unified sequencer concurrency controller scheme for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
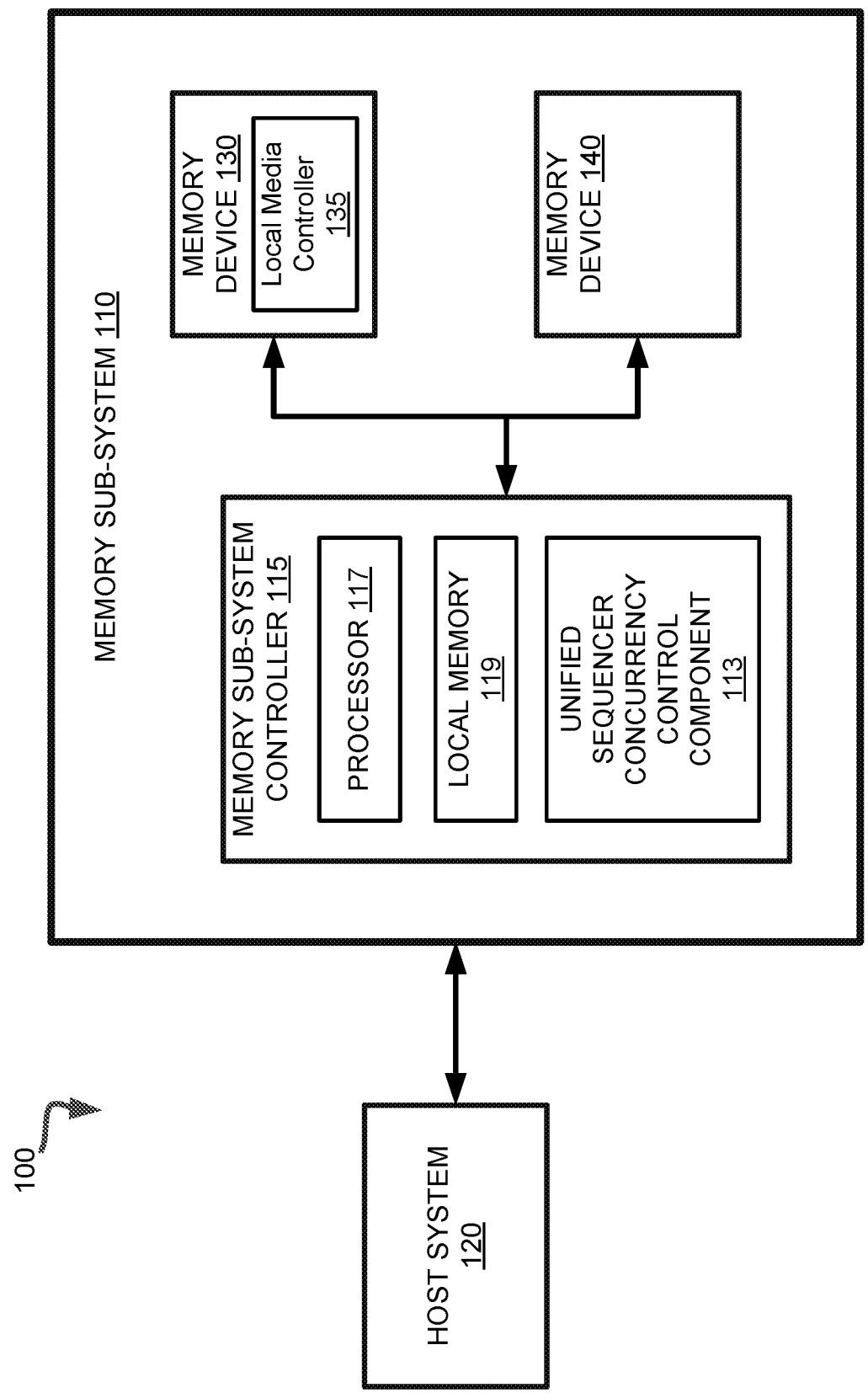
FIG. 1 illustrates an example computing system that includes a memory sub-system in accordance with some embodiments of the present disclosure.

Aspects of the present disclosure are directed to a unified sequencer concurrency control scheme for a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory sub-system can include one or more sequencers to manage memory requests within the memory sub-system. In embodiments, a sequencer can control the performance of the memory sub-system to limit the power consumption of a memory device. For instance, a sequencer can limit the power consumption of a memory device when the memory device becomes overheated. Overheating of a memory device can accelerate degradation of the memory device and can lead to errors within the data stored on the memory device. When the device temperature exceeds a certain temperature, a sequencer can reduce the performance of the memory device by reducing the input/output (I/O) throughput for the memory device. That is, the sequencer can limit the number of I/O operations executed referencing the memory device.

Some sequencers within a memory sub-system use a concurrency table to determine whether to execute a command when implementing a limited power environment. A command can be received from the host system, and/or can be retrieved from a command queue. A command can be, for example, a read command or a write command. The sequencer can use the concurrency table to determine whether to execute a command referencing a particular memory device based on the number of memory device partitions with respect to which memory access commands are being executed. A partition can refer to a section of a memory device which is associated, e.g., with a single host application or execution thread. In some embodiments, the concurrency table can have x rows and x columns, where x is the number of partitions in a memory device. The columns in the table can list the number of partitions currently executing write commands, while the rows in the table can list the number of partitions currently executing read commands. The cells of the table can be populated with a flag indicating whether executing another command will exceed the power limits for the die. For example, a die may be able to support up to 20 partitions in write as long as the number of partitions in read does not exceed 12. Hence, the cell at the intersection of the column indicating 20 partitions in write and the row indicating 12 partitions in read can include a flag indicating that the power used to execute the commands is within the limit, while the cell at the intersection of the column indicating 21 partitions in write and the row indicating 12 partitions in read can include a flag indicating that the power used to execute the commands is not within the limit.

The sequencer can use the current number of partitions in read and the current number of partitions in write to determine whether executing another command would exceed the power limits of the memory die. That is, to continue the example above, if the current number of partitions in write is 20 and the current number of partitions in read is 11, the memory sub-system controller can use the concurrency table to determine that executing another read command would be within the power limit. However, if the current number of partitions in write is 20 and the current number of partitions in read is 12 the memory sub-system controller can use the concurrency table to determine that executing another read command would not be within the power limit.

Relying on such a concurrency table, however, may have certain drawbacks. For instance, as the number of partitions increases, the concurrency table can become unmanageably large. For example, as the number of partitions increases to 64 or 128, the size of the concurrency table also increases accordingly. Storing such a large concurrency table can be impractical and inefficient for many memory sub-systems. Furthermore, the two-dimensional concurrency table described above is limited to two command types. In order to accommodate additional command types, such as force write and refresh commands, the concurrency table would need to become three- or four-dimensional. The complexity and size of such a table is inefficient and difficult to store within the memory sub-system.

Aspects of the present disclosure address the above and other deficiencies by having a memory sub-system that includes a unified concurrency sequencer controller that can determine whether to execute a command based on the current power usage of a memory device without using a concurrency table. The memory sub-system can use the sequencer to implement certain power-limited environments by adjusting the performance level of the memory devices within the memory sub-system. Since the input/output (I/O) throughput of a memory device heavily affects the performance level of the memory device, to accommodate a power-limited environment, the sequencer can adjust the I/O throughput. An example of a power-limited environment can be utilized for prevent or mitigate overheating of the memory sub-system and/or of a memory device. The sequencer can detect the temperature of the media within the sub-system, and can adjust the input/output throughput directed to the media based on the temperature reading.

To adjust the I/O throughput, the sequencer can detect an I/O command directed to a memory device within the memory sub-system. In some embodiments, the sequencer can retrieve an I/O command from a queue of commands awaiting execution. The sequencer can determine the command type. The command type can be a read command, a write command, a force write command, or a refresh command. A force write command can be generated by the memory sub-system controller, for example. In embodiments, a write command (or a normal write command) can be executed by first reading the referenced data block to determine whether the value already stored matches the new value to be written. If so, the normal write does not change the value stored in the data block. A force write, on the other hand, does not perform the pre-read operation and rather applies a voltage to every data block. A normal write consumes relatively less power and contributes a relatively lower wear to the memory device than a force write. A force write, however, can be used to clear certain memory disturb effects. A refresh command can involve a series of operations for reading data stored at a memory cell(s) of a memory device and re-writing the data back to the same memory cell(s). Additional command types are possible.

The sequencer can also determine the current power usage level of the memory device referenced by the I/O command. To determine the current power usage level, the sequencer can determine, for each type of memory access commands, the number of partitions with respect to which memory access commands of this type are being executed (i.e., the number of partitions executing read commands, the number of partitions executing write commands, the number of partitions executing force write commands, and the number of partitions executing refresh commands). The sequencer can allocate a weight value to each number of partitions to determine the current power usage level. The weight values can be predetermined and stored in the memory sub-system controller. Each weight value can be a function of the power level required to execute the corresponding command type. Hence, to determine the current power usage level, the sequencer can compute a weighted sum of the numbers of partitions per command type (e.g., the sum of the product of the read command weight value and the number of partitions executing read commands, the product of the write command weight value and the number of partitions executing write commands, the product of the force write command weight value and the number of partitions executing force write commands, and the product of the refresh command weight value and the number of partitions executing refresh commands). The sequencer can also adjust the result by adding the peripheral power consumption level for the memory device.

The sequencer can also determine the current power limit associated with the memory device. The sequencer can change the current power limit to implement certain power-limited environments. A power-limited environment can be imposed when the memory device reaches a certain temperature. In embodiments, there can be multiple levels of power-limited environments according to the temperature of the memory device. For example, if the temperature of the memory device is within a first range (e.g., the secure range), the power limit can be high, and thus the memory sub-system can allow a higher I/O throughput to the memory device. If the temperature of the memory device is within a second range, the power limit can be set lower, and thus the memory sub-system can allow a lower I/O throughput to the memory device. If the temperature of the memory device is within a third range, or above a threshold value, the power limit can be set to a minimum value, and thus the memory sub-system can significantly lower the I/O throughput to the memory device until the temperature is below the threshold value.

Advantages of the present disclosure include, but are not limited to, reducing the amount of data stored to regulate the performance of the memory sub-system. That is, aspects of the present disclosure do not require the memory sub-system to store a concurrency table that increases with every additional command type and additional memory device partitions. Rather, the memory sub-system controller can dynamically determine whether to execute I/O commands in power-limited environments using data that is already stored and maintained in the memory sub-system (i.e., the number of partitions executing each command type). This dynamic determination can more quickly adjust the I/O throughput for overheating memory device, thus resulting in increased performance of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc.

The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a unified sequencer concurrency control component 113 that can adjust the I/O throughput for a particular memory device within the memory sub-system based on certain power limiting parameters. In some embodiments, the memory sub-system controller 115 includes at least a portion of the unified sequencer concurrency control component 113. In some embodiments, the unified sequencer concurrency control component 113 is part of the host system 110, an application, or an operating system. In other embodiments, local media controller 135 includes at least a portion of unified sequencer concurrency control component 113 and is configured to perform the functionality described herein.

The unified sequencer concurrency control ("USCC") component 113 can adjust the I/O throughput for a particular memory device based on certain power limiting parameters. The USCC component 113 can store predefined power consumption levels that denote the power level consumed per partition in each type of command. For example, for a memory device that supports four types of commands, the USCC component 113 stores four predefined power consumption levels, one for each type of command. For illustrative purposes, $P_R$ can represent the power level consumed per partition executing read commands, $P_W$ can represent the power level consumed per partition executing write commands, $P_{FW}$ can represent the power level consumed per partition executing force write commands, and $P_R$ can represent the power level consumed per partition executing refresh commands. A memory device can support additional or fewer command types, and accordingly the USCC component 113 can store additional or fewer predefined power consumption levels. These power consumption levels can be pre-characterized, e.g., during manufacturing of the memory device, and hence are constant values. However, the power consumption levels can vary based on the type of memory device and memory sub-system.

The USCC component 113 can determine whether to enter into a power-limited environment. A power-limited environment is one in which the USCC component 113 throttles I/O throughput to a memory device in order to reduce the power consumed by the memory device. High power consumption can lead to a memory device overheating, and hence entering a power-limited environment can be used to prevent or mitigate overheating of the memory device, and/or can help cool down a memory device if it has reached a certain temperature range. Since a high proportion of power is consumed by I/O throughput, a power-limited environment can including limiting the number of commands (or I/O operations) performed on the memory device.

In some embodiments, the USCC component 113 can limit the number of commands performed on a memory device by determining whether adding the power level estimated to execute an additional command to the current power level consumed by the memory device would exceed a power limit. The USCC component 113 can adjust the power limit based on the power-limited environment of the memory device. For example, if the memory device is within a relatively low temperature range (e.g., under 50 degrees Celsius), the USCC component 113 can set the power limit value high: if the memory device is within a middle temperature range (e.g., between 51 degrees Celsius and 70 degrees Celsius), the USCC component 113 can set the power limit value to a lower value; if the memory device is within a high temperature range (e.g., above 70 degrees Celsius), the USCC component 113 can set the power limit value to a minimum value. These temperature ranges and number of ranges are included for illustrative purposes only; there can be any number of ranges, and the values of the temperatures within each range can be different than those listed here.

The USCC component 113 can detect an I/O command referencing a memory device. Before determining to execute the I/O command, the USCC component 113 can determine whether executing the I/O command would exceed the power limit for the memory device. The USCC component 113 can first determine the current power level consumed by the memory device. To determine the current power level consumed, the USCC component 113 can identify how many partitions of the memory device are currently executing each type of command. The USCC component 113 can then compute a weighted sum of the numbers of partitions per command type (e.g., the sum of the product of each number of partitions and the respective constant parameters denoting the power level consumed per partition in each type of command). The USCC component 113 can adjust the result by adding the peripheral power consumption level to the current power level consumed for the memory die. In order to determine whether executing the I/O command would exceed the power limit, the USCC component 113 can add the power level consumed for one partition executing the I/O command type to the current power level consumed by the memory device. If that value is above or equal to the power limit value, the USCC component 113 can determine not to execute the I/O command. If the value is below the power limit value, the USCC component 113 can determine to execute the I/O command. Further details with regards to the operations of the USCC component 113 are described below.

Figure 2:
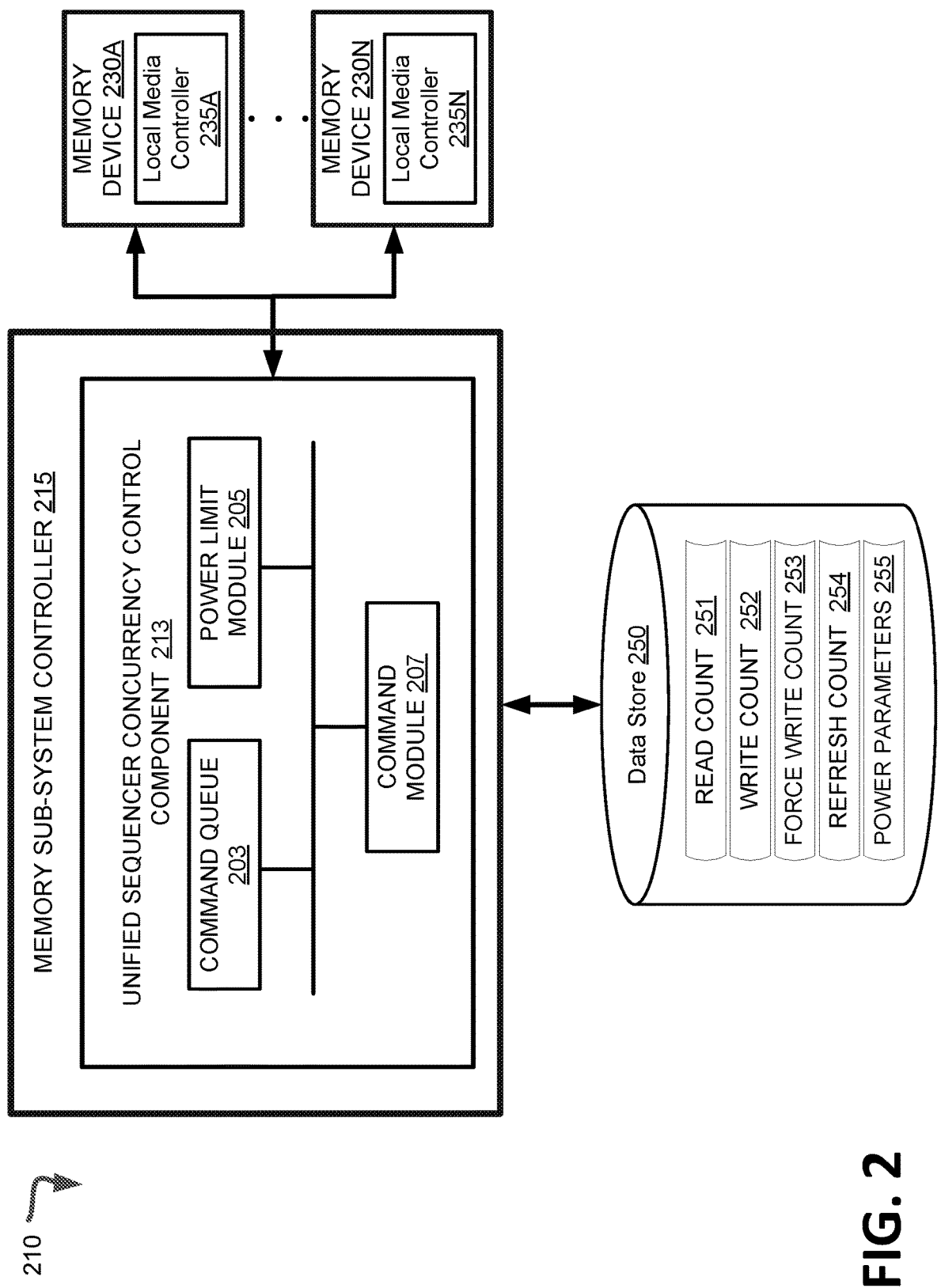
FIG. 2 illustrates an example memory sub-system in more detail, in accordance with some embodiments of the present disclosure.

FIG. 2 illustrates an example of the memory sub-system 210 in more detail, in accordance with some embodiments of the present disclosure. The memory sub-system 210 can include a memory sub-system controller 215 connected to multiple memory devices 230A-230N. Memory devices 230A-230N can be volatile or non-volatile memory devices. In embodiments, memory devices 230A-230N are 3D cross-point memory devices. Memory devices 230A-230N can include a respective local media controller 235A-235N. In some embodiments, memory sub-system 210 can include a data store 250. The data store 250 can store the read count 251 for memory device 230A-230N, the write count 252 for each memory device 230A-230N, the force write count 253 for each memory device 230A-230N, and the refresh count 254 for each memory device 230A-230N. In embodiments, the read count 251 can represent the number of partitions of a memory device currently executing read commands, and can be represented as $n_R$; the write count 252 can represent the number of partitions of a memory device currently executing write commands, and can be represented as $n_W$; the force write count 253 can represent the number of partitions of a memory device currently executing force write commands, and can be represented as $n_{FW}$; the refresh count 254 can represent the number of partitions of a memory device currently executing refresh commands, and can be represented as $n_{RF}$. In embodiments, the local media controller 235A-235N keeps track of the read count, the write count, the force write count, and the refresh count for the respective memory device 230A-230N.

The data store 250 can also store the power parameter values 255 for the memory sub-system. The power parameter values 255 can be the predefined power consumption levels that denote the power level consumed per partition executing each type of command, as described above. For example, the power parameters 255 can include $P_R$, which represents the power level consumed per partition executing read commands; $P_W$, which represents the power level consumed per partition executing write commands; $P_{FW}$, which represents the power level consumed per partition executing force write commands; and $P_{RF}$, which represents the power level consumed per partition executing refresh commands. Power parameters 255 can also store $P_0$, which represents the peripheral power level consumed by a memory device when it is active. These power parameter values can be pre-characterized, e.g., during manufacturing of the memory device, and hence are constant values.

Memory sub-system controller 215 can include a unified sequencer concurrency control ("USCC") component 213. The USCC component 213 can perform the same functions as the USCC component 113 of FIG. 1. The USCC component 213 can include a command queue module 203, a power limit module 205, a command module 217. The command queue 203 can be a list of commands awaiting execution. A command can be a read command, a write command, a force write command, or a refresh command, for example.

The power limit module 205 can determine the power limits for each memory device 230A-230N. That is, the power limit module 205 can set the power limits based on the power-limited environment of the memory device. In embodiments, the power limit module 205 can detect a temperature of a memory device 230A-230N. Memory devices 230A-230N can have a thermal sensor connected to them. In embodiments, The local media controller 235A-235N can send a temperature reading of the thermal sensor directly to the power limit module 205. In embodiments, the power limit module 205 can access the thermal sensor attached to memory devices 230A-230N and detect the temperature reading directly. The power limit module 205 can then set the power limits for each memory device 230A-230N based on the temperature reading. For example, if the memory device is within a relatively low temperature range (e.g., under 50 degrees Celsius), the USCC component 113 can set the power limit value high; if the memory device is within a middle temperature range (e.g., between 51 degrees Celsius and 70 degrees Celsius), the USCC component 113 can set the power limit value to a lower value; if the memory device is within a high temperature range (e.g., above 70 degrees Celsius), the USCC component 113 can set the power limit value to a minimum value. These temperature ranges and number of ranges are included for illustrative purposes only; there can be any number of ranges, and the values of the temperatures within each range can be different than those listed here. In embodiments, the power limit module 205 can set the power limit value based on a temperature reading for the memory sub-system as a whole.

The command module 207 can determine whether to execute a command from the command queue 203. In embodiments, the command module 207 can identify a command awaiting execution. For example, the command module 207 can identify the command at the top of the command queue 203. In order to determine whether to execute the identified command, the command module 207 can identify the memory device 230A-230N referenced by the identified command. The command module 207 can then determine the current power level consumed by the memory device. The command module 207 can identify the current read count 251, write count 252, force write count 253, and refresh count 254 for the memory device. The command module 207 can then apply the power parameter values 255 to the current counts 251-254 to determine the current power level consumed value by the memory device. More specifically, the current power level consumed by a memory device can be expressed as P, where $P = P_0 + n_R P_R + n_W P_W + n_{FW} P_{FW} + n_{RF} P_{RF}$.

The command module 207 can then add the power level consumed by executing the identified command to the current power level consumed by the memory device. For example, if the identified command is a write command, the estimated power level consumed by executing the identified can be expressed as $P + P_W$. The command module 207 can compare the that value ($P + P_W$) to the power limit, as determined by power limit module 205. If the power level consumed by executing the identified command does not exceed the current power limit for the memory device, the command module 207 can cause the identified command to be executed. If the power level consumed by executing the identified command exceeds or is equal to the power limit, the command module 207 can determine not to execute the identified command. In embodiments, the command module 207 can retrieve the next command in command queue 203 and determine whether executing the second command would exceed the current power limit.

Figure 3:
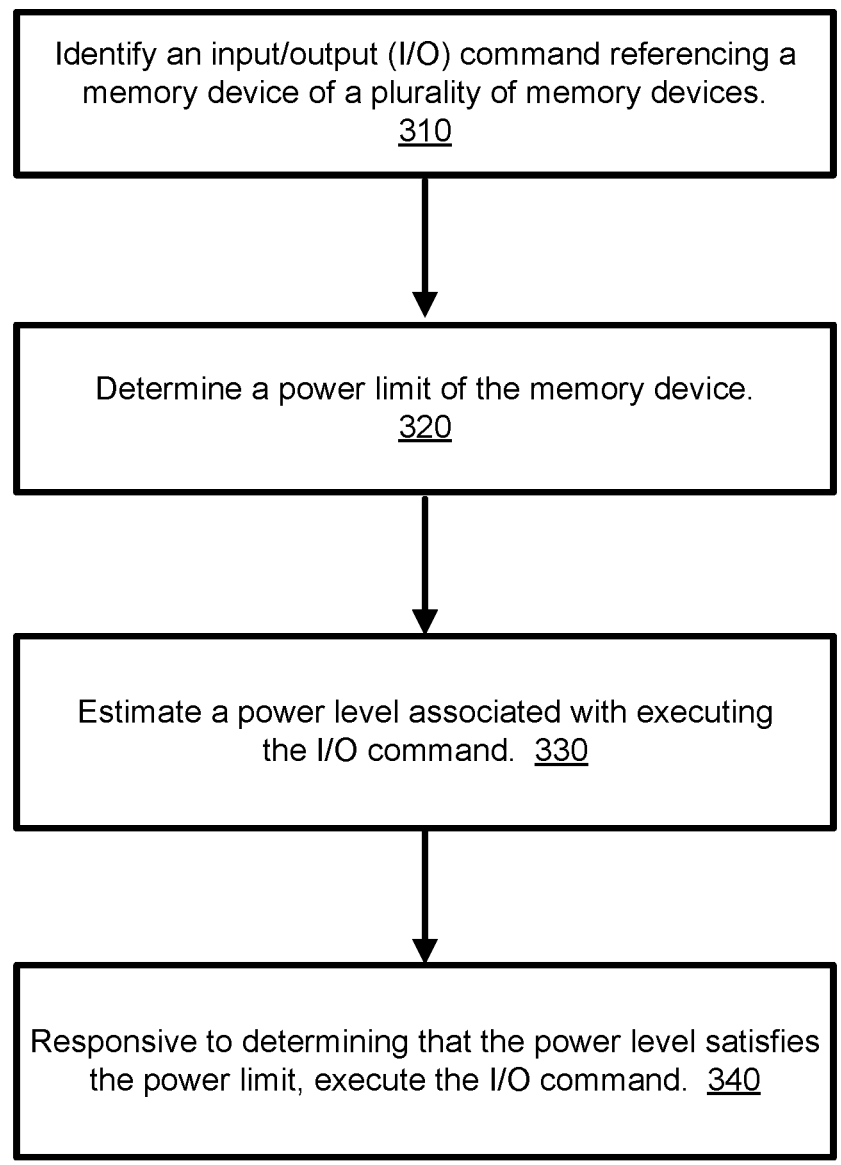
FIG. 3 is a flow diagram of an example method to implement a unified sequencer concurrency controller, in accordance with some embodiments of the present disclosure.

FIG. 3 is a flow diagram of an example method 300 to implement a unified sequencer concurrency controller, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the unified sequencer concurrency control component 113 of FIG. 1 or the unified sequencer concurrency control component 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic identifies an input/output (I/O) command referencing a memory device of a plurality of memory devices within a memory sub-system. In embodiments, the I/O command can be a read command, a write command, a force write command, or a refresh command. In embodiments, the processing logic can identify the I/O command as the first I/O command in a queue of I/O commands awaiting execution. In some embodiments, the processing logic can intercept an I/O command from the host system. In some embodiments, the processing logic can generate the I/O command to perform a media management operation, such as wear leveling.

At operation 320, the processing logic determines a power limit of the memory device. In order to determine the power limit of the memory device, the processing logic can detect a temperature value associated with the memory device. In some embodiments, the memory device can have a thermal sensor attached to it (or built-in to it). The memory device controller can send, to the processing device, a temperature reading value from the thermal sensor. In embodiments, the memory device controller sends the temperature reading value periodically (e.g., every 1 minute), or the memory device controller sends the temperature reading value in response to a request for a temperature value received from the processing logic. In some embodiments, the processing logic can access the thermal sensor directly to determine the temperature of the memory device.

The processing logic can set the power limit according to the temperature value of the memory device. The memory sub-system can store predefined power consumption limit values, and the processing logic can select one of the predefined power consumption limit values based on the temperature value. For example, if the temperature is within a relatively low temperature range (e.g., under 50 degrees Celsius), the processing logic can set the power limit to a high predefined power consumption limit value; if the temperature is within a middle temperature range (e.g., between 51 degrees Celsius and 70 degrees Celsius), the processing logic can set the power limit to a lower predefined power consumption limit value; if the temperature is within a high temperature range (e.g., above 70 degrees Celsius), the processing logic can set the power limit to a minimum predefined power consumption limit value.

At operation 330, the processing logic estimates a power level associated with executing the I/O command. In order to estimate the power level associated with executing the I/O command, the processing logic can first determine the current power usage level of the memory device. The processing logic can determine the current power usage level of the memory device by identifying a first number of partitions of the memory device currently executing read commands (represented as $n_R$ for illustrative purposes), a second number of partitions of the memory device currently executing write commands (represented as $n_W$ for illustrative purposes), a third number of partitions of the memory device currently executing force write commands (represented as $n_{FW}$ for illustrative purposes), and a fourth number of partitions of the memory device currently executing refresh commands (represented as $n_{RF}$ for illustrative purposes).

The processing logic can then determine the current power usage level by adding a base power usage level (represented as $P_0$ for illustrative purposes) to the first number of partitions ($n_R$) weighted by a read command power usage value level ($P_R$), the second number of partitions ($n_W$) weighted by a write command power usage value level ($P_W$), the third number of partitions ($n_{FW}$) weighted by a force write command power usage value level ($P_{FW}$), and the fourth number of partitions ($n_{RF}$) weighted by a refresh command power usage value level ($P_{RF}$). Hence, for illustrative purposes, the current power usage level of the memory device can be represented as $P_0 + n_R P_R + n_W P_W + n_{FW} P_{FW} + n_{RF} P_{RF}$.

In order to estimate the power level associated with executing the I/O command, the processing logic can add the power usage level consumed by executing the I/O command to the current power usage level of the memory device. That is, if the I/O command is a read command, the power usage level associated with executing the I/O command can be represented as $P_0 + n_R P_R + n_W P_W + n_{FW} P_{FW} + n_{RF} P_{RF} + P_R$. The processing logic can determine that the power usage level associated with executing the I/O command satisfies the power limit threshold by determining that $P_0 + n_R P_R + n_W P_W + n_{FW} P_{FW} + n_{RF} P_{RF} + P_R$ is below the power limit.

In embodiments, the base power usage level of the memory device ($P_0$), the read command power usage level value ($P_R$), the write command power usage level value ($P_W$), the force write command power usage level value ($P_{FW}$), and the refresh command power usage level value ($P_{RF}$) are predefined values based on the memory device. These values can be pre-characterized, e.g., during manufacturing of the memory device, and hence can be constant values. These can vary based on the type of memory device and memory sub-system.

At operation 340, responsive to determining that the power level satisfies the power limit, the processing logic executes the I/O command.

In some embodiments, responsive to determining that the power level associated with executing the I/O command does not satisfy the power limit (i.e., $P_0 + n_R P_R + n_W P_W + n_{FW} P_{FW} + n_{RF} P_{RF} + P_R$ is equal to or exceed the power limit value), the processing logic identifies a second I/O command from the queue of I/O commands. The processing logic then determines whether to execute the second I/O command based on whether the power level associated with executing the second I/O command satisfies the power limit. That is, the processing logic estimates a second power level associated with executing the second I/O command. Responsive to determining that the second power level satisfies the power limit, the processing logic can cause the second I/O command to be executed.

Figure 4:
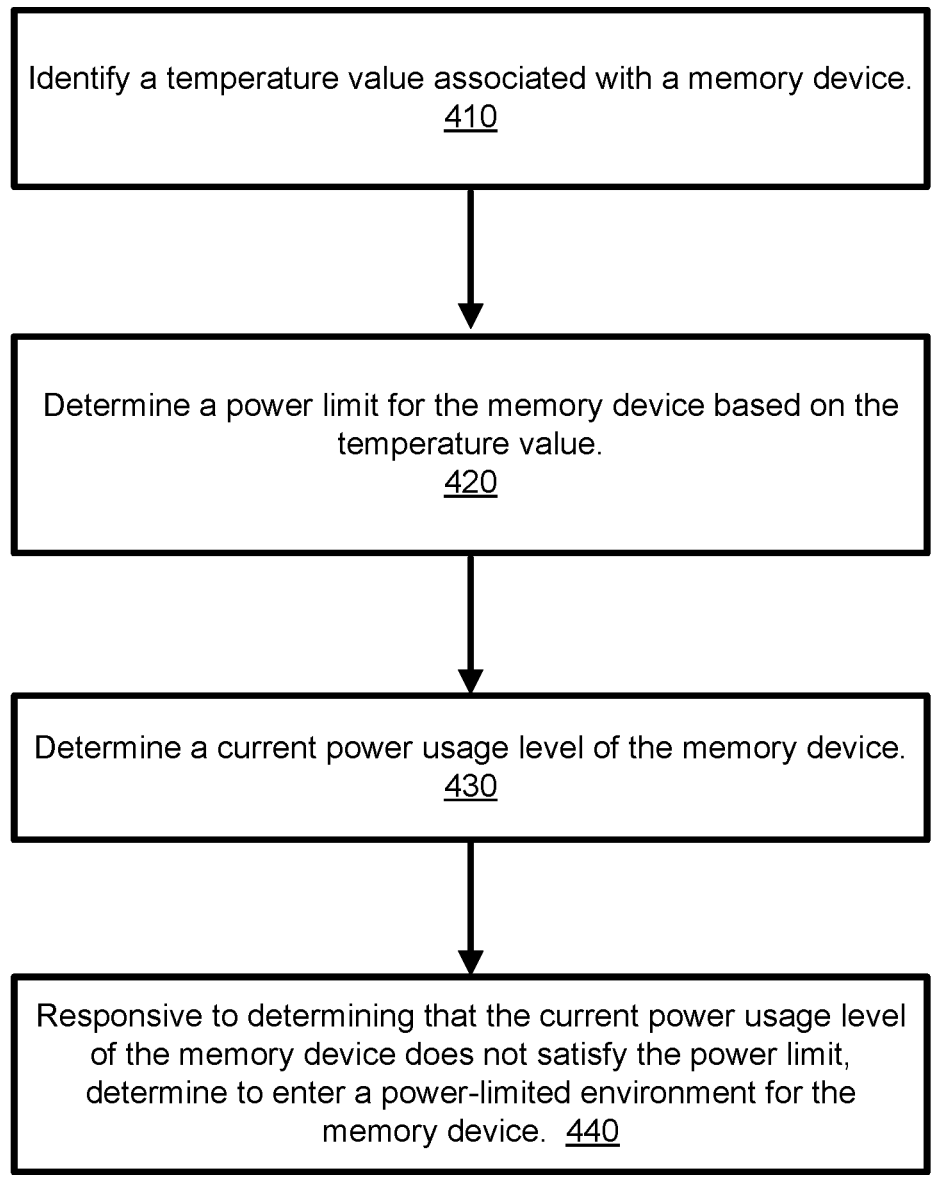
FIG. 4 is a flow diagram of an example method to implement a unified sequencer concurrency controller to limit the power of a memory device, in accordance with some embodiments of the present disclosure.

FIG. 4 is a flow diagram of an example method 400 to implement a unified sequencer concurrency controller to limit the power of a memory device, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the unified sequencer concurrency control component 113 of FIG. 1 or the unified sequencer concurrency control component 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic identifies a temperature value associated with a memory device. In embodiments, the processing logic can receive a temperature reading value from a thermal sensor connected to the memory device. The memory device controller can send, to the processing device, a temperature value (i.e., temperature reading value) from the thermal sensor. In embodiments, the memory device controller sends the temperature reading value periodically (e.g., every 1 minute), or the memory device controller sends the temperature value in response to a request for a temperature value received from the processing logic. In some embodiments, the processing logic can access the thermal sensor directly to determine the temperature of the memory device.

At operation 420, determines a power limit for the memory device based on the temperature value. In embodiments, the memory sub-system can store predefined power consumption limits, and the processing logic can select one of the predefined power consumption limits based on the temperature value. For example, if the temperature value is within a relatively low temperature range (e.g., under 50 degrees Celsius), the processing logic can set the power limit value to high; if the temperature value is within a middle temperature range (e.g., between 51 degrees Celsius and 70 degrees Celsius), the processing logic can set the power limit value to a lower value; if the temperature value is within a high temperature range (e.g., above 70 degrees Celsius), the processing logic can set the power limit value to a minimum value.

At operation 430, the processing logic determines a current power usage level of the memory device. The processing logic can determine the current power usage level of the memory device by identifying a first number of partitions of the memory device currently executing read commands (represented as $n_R$ for illustrative purposes), a second number of partitions of the memory device currently executing write commands (represented as $n_W$, for illustrative purposes), a third number of partitions of the memory device currently executing force write commands (represented as $n_{FW}$ for illustrative purposes), and a fourth number of partitions of the memory device currently executing refresh commands (represented as $n_{RF}$ for illustrative purposes).

The processing logic can then determine the current power usage level by adding a base power usage level (represented as $P_0$ for illustrative purposes) to the first number of partitions ($n_R$) weighted by a read command power usage level value ($P_R$), the second number of partitions ($n_W$) weighted by a write command power usage level value ($P_W$), the third number of partitions ($n_{FW}$) weighted by a force write command power usage level value ($P_{FW}$), and the fourth number of partitions ($n_{RF}$) weighted by a refresh command power usage level value ($P_{RF}$). Hence, for illustrative purposes, the current power usage level of the memory device can be represented as $P_0+n_R P_R+n_W P_W+n_{FW}P_{FW}+n_{RF}P_{RF}$.

In embodiments, the base power usage level of the memory device ($P_0$), the read command power usage level value ($P_R$), the write command power usage level value ($P_W$), the force write command power usage level value ($P_{FW}$), and the refresh command power usage level value ($P_{RF}$) are predefined values based on the memory device. These values can be pre-characterized, e.g., during manufacturing of the memory device, and hence can be constant values. These can vary based on the type of memory device and memory sub-system.

At operation 440, responsive to determining that the current power usage level of the memory device does not satisfy the power limit, the processing logic determines to enter a power-limited environment for the memory device. That is, the processing logic can determine that the current power usage level of the memory device exceeds the power limit, indicating that the memory device is using too much power. Using too much can place the memory device in danger of overheating, for example. In embodiments, the processing logic implements a power-limited environment by throttling I/O throughput associated with the memory device. That is, the processing logic can limit the number of I/O commands directed to the memory device.

In embodiments, responsive to determining that the current power usage level of the memory device satisfies the power limit, the processing logic can identify an I/O command referencing the memory device. For example, the processing logic can retrieve an I/O command from a queue of commands awaiting execution, or the processing logic can identify an/O command from the host system. As another example, the processing logic can identify a command initiated by memory sub-system controller. The I/O command can be a write command, a read command, a force write command, or a refresh command, for example. The processing logic can estimate a power level with executing the I/O command. Responsive to determining that the power level satisfies the power limit, the processing logic can cause the I/O command to be executed.

Figure 5:
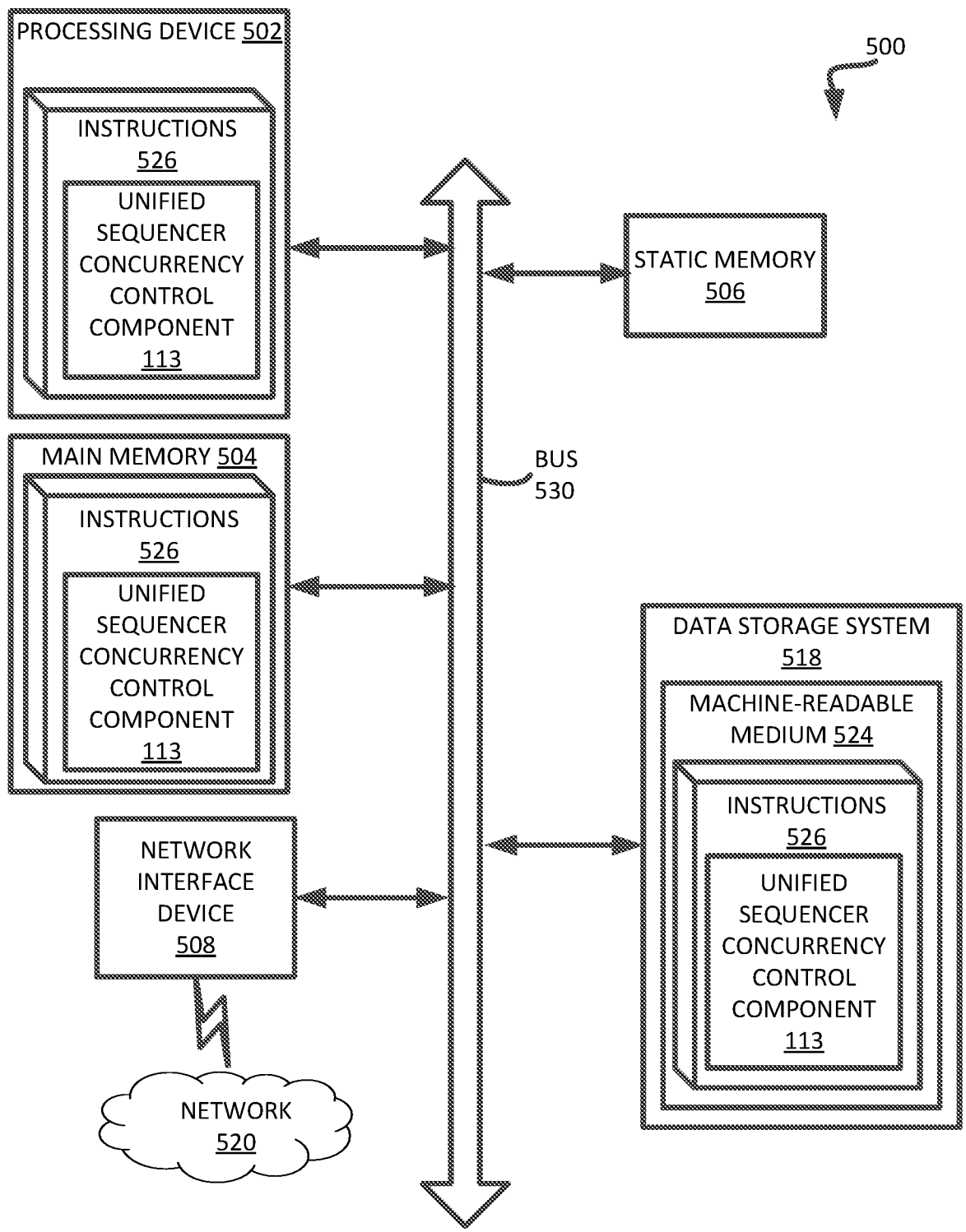
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the unified sequencer concurrency control component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a unified sequencer concurrency control component (e.g., the unified sequencer concurrency control component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of memory devices; and
a processing device, operatively coupled with the plurality of memory devices, to perform operations comprising:
identifying an input/output (I/O) command referencing a memory device of the plurality of memory devices;
identifying a temperature value associated with the memory device;
selecting, based on the identified temperature value associated with the memory device, a power consumption limit of a plurality of predefined power consumption limits for the memory device, wherein each of the plurality of predefined power consumption limits is associated with a corresponding temperature value range;
identifying a plurality of predetermined weight values corresponding to a power level associated with a corresponding command type, wherein the plurality of predetermined weight values comprises a read command weight value, a write command weight value, a force write command weight value, and a refresh command weight value;
estimating a power level associated with executing the I/O command by adding a predetermined weight value corresponding to the power level associated with executing the corresponding command type of the I/O command to a current power usage level of the memory device; and
responsive to determining that the power level associated with executing the I/O command satisfies the power consumption limit, executing the I/O command.

2. The system of claim 1, wherein the I/O command is one of a write command, a read command, a force write command, or a refresh command.

3. The system of claim 1, wherein selecting the power consumption limit comprises:
detecting the temperature value associated with the memory device; and
setting the power consumption limit according to the temperature value.

4. The system of claim 1, wherein estimating the power level associated with executing the I/O command comprises:
determining the current power usage level of the memory device; and
adding a power usage level associated with executing the I/O command to the current power usage level of the memory device.

5. The system of claim 4, wherein determining the current power usage level of the memory device further comprises:
identifying a first number of partitions of the memory device executing read commands, a second number of partitions of the memory device executing write commands, a third number of partitions of the memory device executing force write commands, and a fourth number of partitions of the memory device executing refresh commands; and
determining the current power usage level by adding a base power usage level of the memory device to the first number of partitions weighted by a read command power usage level value, the second number of partitions weighted by a write command power usage level value, the third number of partitions weighted by a force write command power usage level value, and the fourth number of partitions weighted by a refresh command power usage level value.

6. The system of claim 5, wherein the base power usage level of the memory device, the read command power usage level value, the write command power usage level value, the force write command power usage level value, and the refresh command power usage level value are predefined values based on the memory device.

7. The system of claim 1, wherein the I/O command is retrieved from a queue of I/O commands, and wherein the operations further comprise:
responsive to determining that the power level associated with executing the I/O command does not satisfy the power consumption limit, identifying a second I/O command from the queue of I/O commands;
estimating a second power level associated with executing the second I/O command; and
responsive to determining that the second power level satisfies the power consumption limit, executing the second I/O command.

8. A non-transitory computer-readable storage medium comprising instructions that, when executed by a processing device, cause the processing device to perform operations comprising:
identifying an input/output (I/O) command referencing a memory device of a plurality of memory device;
identifying a temperature value associated with the memory device;
selecting, based on the identified temperature associated with the memory device, a power consumption limit of a plurality of predefined power consumption limits for the memory device, wherein each of the plurality of predefined power consumption limits is associated with a corresponding temperature value range;
identifying a plurality of predetermined weight values corresponding to a power level associated with executing a corresponding command type, wherein the plurality of predetermined weight values comprises a read command weight value, a write command weight value, a force write command weight value, and a refresh command weight value;
estimating a power level associated with executing the I/O command by adding a predetermined weight value corresponding to the power level associated with executing the corresponding command type of the I/O command to a current power usage level of the memory device; and
responsive to determining that the power level associated with executing the I/O command satisfies the power consumption limit, executing the I/O command.

9. The non-transitory computer-readable storage medium of claim 8, wherein the I/O command is one of a write command, a read command, a force write command, or a refresh command.

10. The non-transitory computer-readable storage medium of claim 8, wherein selecting the power consumption limit comprises:
detecting the temperature value associated with the memory device; and
setting the power consumption limit according to the temperature value.

11. The non-transitory computer-readable storage medium of claim 8, wherein estimating the power level associated with executing the I/O command comprises:

determining the current power usage level of the memory device; and adding a power usage level associated with executing the I/O command to the current power usage level of the memory device.

12. The non-transitory computer-readable storage medium of claim 11, wherein determining the current power usage level of the memory device further comprises:

identifying a first number of partitions of the memory device executing read commands, a second number of partitions of the memory device executing write commands, a third number of partitions of the memory device executing force write commands, and a fourth number of partitions of the memory device executing refresh commands; and determining the current power usage level by adding a base power usage level of the memory device to the first number of partitions weighted by a read command power usage level value, the second number of partitions weighted by a write command power usage level value, the third number of partitions weighted by a force write command power usage level value, and the fourth number of partitions weighted by a refresh command power usage level value.

13. The non-transitory computer-readable storage medium of claim 12, wherein the base power usage level of the memory device, the read command power usage level value, the write command power usage level value, the force write command power usage level value, and the refresh command power usage level value are predefined values based on the memory device.

14. The non-transitory computer-readable storage medium of claim 8, wherein the I/O command is retrieved from a queue of I/O commands, and wherein the operations further comprise:

responsive to determining that the power level associated with executing the I/O command does not satisfy the power consumption limit, identifying a second I/O command from the queue of I/O commands;

estimating a second power level associated with executing the second I/O command; and responsive to determining that the second power level satisfies the power consumption limit, executing the second I/O command.

15. A method comprising:

identifying an input/output (I/O) command referencing a memory device;

identifying a temperature value associated with the memory device;

selecting, based on the identified temperature value associated with the memory device, a power consumption limit of a plurality of predefined power consumption limits for the memory device, wherein each of the plurality of predefined power consumption limits is associated with a corresponding temperature value range;

identifying a plurality of predetermined weight values corresponding to a power level associated with executing a corresponding command type, wherein the plurality of predetermined weight values comprises a read command weight value, a write command weight value, a force write command weight value, and a refresh command weight value;

estimating a power level associated with executing the I/O command by adding a predetermined weight value corresponding to the power level associated with executing the corresponding command type of the I/O command to a current power usage level of the memory device; and responsive to determining that the power level associated with executing the I/O command satisfies the power consumption limit, executing the I/O command.

16. The method of claim 15, wherein selecting the power consumption limit comprises:

detecting the temperature value associated with the memory device; and setting the power consumption limit according to the temperature value.

17. The method of claim 15, wherein estimating the power level associated with executing the I/O command comprises:

determining the current power usage level of the memory device; and adding a power usage level associated with executing the I/O command to the current power usage level of the memory device.

18. The method of claim 17, wherein determining the current power usage level of the memory device further comprises:

identifying a first number of partitions of the memory device executing read commands, a second number of partitions of the memory device executing write commands, a third number of partitions of the memory device executing force write commands, and a fourth number of partitions of the memory device executing refresh commands; and determining the current power usage level by adding a base power usage level of the memory device to the first number of partitions weighted by a read command power usage level value, the second number of partitions weighted by a write command power usage level value, the third number of partitions weighted by a force write command power usage level value, and the fourth number of partitions weighted by a refresh command power usage level value.

19. The method of claim 18, wherein the base power usage level of the memory device, the read command power usage level value, the write command power usage level value, the force write command power usage level value, and the refresh command power usage level value are predefined values based on the memory device.

20. The method of claim 15, wherein the I/O command is retrieved from a queue of I/O commands, and wherein the method further comprise:

responsive to determining that the power level associated with executing the I/O command does not satisfy the power consumption limit, identifying a second I/O command from the queue of I/O commands;

estimating a second power level associated with executing the second I/O command; and responsive to determining that the second power level satisfies the power consumption limit, executing the second I/O command.

* * * * *